(12) United States Patent
Stockreiter et al.

(10) Patent No.: US 8,519,044 B2
(45) Date of Patent: Aug. 27, 2013

(54) GLASS FIBER REINFORCED POLYPROPYLENE

(75) Inventors: Wolfgang Stockreiter, Puchenau (AT); Renate Schninger, Linz (AT); Jochen Kastl, Ottensheim (AT)

(73) Assignee: Borealis Technology Oy, Porvoo (FI)

( * ) Notice: Subject to any disclaimer, the term of this patent is extended or adjusted under 35 U.S.C. 154(b) by 0 days.

(21) Appl. No.: 13/488,980

(22) Filed: Jun. 5, 2012

(65) Prior Publication Data

US 2012/0302696 A1    Nov. 29, 2012

Related U.S. Application Data

(63) Continuation of application No. 12/743,763, filed as application No. PCT/EP2008/009837 on Nov. 20, 2008, now abandoned.

(30) Foreign Application Priority Data

Nov. 20, 2007   (EP) .................... 07022490

(51) Int. Cl.
*C08K 3/40* (2006.01)
*C08L 23/00* (2006.01)

(52) U.S. Cl.
USPC .......................... 524/494; 524/528

(58) Field of Classification Search
USPC .......................................... 524/494
See application file for complete search history.

(56) References Cited

U.S. PATENT DOCUMENTS

| 4,740,543 | A | * | 4/1988 | Matsuno et al. | ............... | 524/88 |
| 5,234,879 | A | | 8/1993 | Garoff et al. | | |
| 2008/0033104 | A1 | * | 2/2008 | Grein et al. | ............... | 524/584 |

FOREIGN PATENT DOCUMENTS

| EP | 0614935 A1 | 9/1994 |
| EP | 0886669 B1 | 5/2000 |
| EP | 1357144 A1 | 10/2003 |
| EP | 1600480 A1 | 11/2005 |
| GB | 2179049 A | 2/1987 |
| JP | 1181221 A | 7/1989 |
| JP | 3321059 B2 | 9/2002 |
| WO | 92/12182 A1 | 7/1992 |
| WO | 92/19653 A1 | 11/1992 |
| WO | 92/19658 A1 | 11/1992 |
| WO | 99/33843 A1 | 7/1999 |
| WO | 2005/021644 A1 | 3/2005 |
| WO | 2005/118712 A1 | 12/2005 |

\* cited by examiner

*Primary Examiner* — Hui Chin
(74) *Attorney, Agent, or Firm* — Seed IP Law Group PLLC

(57) ABSTRACT

The present invention concerns a glass fiber reinforced polypropylene composition as well as articles formed from this composition, wherein the composition, comprises a) More than 15-wt % glass fibers, and b) a specific heterophasic polypropylene composition with an at least bimodal disperse phase.

10 Claims, No Drawings

GLASS FIBER REINFORCED POLYPROPYLENE

CROSS-REFERENCE TO RELATED APPLICATIONS

This application is a continuation of U.S. patent application Ser. No. 12/743,763, filed Aug. 13, 2010; which application is a national stage application of International Patent Application No. PCT/EP2008/009837 filed Nov. 20, 2008; which applications are incorporated herein by reference in their entirety.

The present invention concerns an improved glass fiber reinforced polypropylene composition as well as articles formed from this composition

PRIOR ART

Polypropylene is a material used in a wide variety of technical fields and reinforced polypropylenes have in particular gained relevance in fields previously exclusively relying on non-polymeric materials, in particular metals. One particular example of reinforced polypropylenes are glass fiber reinforced polypropylenes. Such materials enable a tailoring of the properties of the composition by selecting the type of polypropylene, the amount of glass fiber and the type of coupling agent used. In the recent past mainly propylene homopolymers have been used in the form of glass fiber reinforced compositions and with such compositions values for E-modulus of about 6000 MPa have been achieved, in combination with heat distortion properties being better than those achievable with isotropic particle filled polypropylenes. However, impact behavior of glass fiber reinforced polypropylene compositions did not meet the stringent requirements in particular for products require high stiffness in combination with good impact properties.

One attempt to overcome this drawback is the use of cross-linking agents in order to improve impact behavior, as suggested in WO 2005/021644. However, the use of cross-linking agents might give rise to troubles during production and the effects achieved did still not lead to a sufficient increase of impact properties. EP 0 614 935 A1 discloses glass fiber reinforced compositions, comprising a polypropylene modified with a rubber component, such as ethylene-propylene-rubber (EPR) or an EPDM. The use of such external rubbers compounded with a polypropylene homopolymer however decreases the stiffness while only marginally improving impact properties, if at all. EP 1 357 144 A1 discloses a glass fiber reinforced composition comprising a mixture of a highly crystalline propylene homopolymer or copolymer with a highly crystalline propylene-ethylene copolymer. These compositions display highly satisfactory stiffness values, such as E-modulus. The impact properties however are not sufficient for applications requiring a combination of good stiffness and good impact properties.

EP 1 600 480 A1 shows propylene polymer compositions with fillers like e.g. glass fibers that have a good impact strength/stiffness balance. However, the document fails to specify any distinct amounts of fillers and does not disclose the combination of favorable properties of compositions according to the present invention.

JP-A-1181221 and JP-B2-3321059 disclose glass fiber reinforced polypropylene resin compositions, comprising a propylene-ethylene block copolymer and unsaturated carboxylic acid modified polypropylene resins. EP 1664186 A1 discloses a glass filled impact propylene copolymer composition useful for the preparation of molded articles. EP 886669 A2 discloses an impact resistance glass filled olefin composition, comprising a specific polypropylene, an impact modifier and functional olefin polymer compatibilizers, together with glass fibers. U.S. Pat. No. 4,740,543 discloses a blend of crystalline propylene-ethylene block copolymers with glass fibers and a copolymer rubber component. However, none of these compositions provide a balance of stiffness and impact properties required for applications such as in the automotive industry, where it is not acceptable to sacrifice either stiffness or impact properties when improving the other property.

OBJECT OF THE PRESENT INVENTION

Accordingly it is the object of the present invention to provide an improved glass fiber reinforced polypropylene composition, showing a satisfactory balance of mechanical properties, in particular good impact properties and good stiffness values. Due to the increasing demands, this should also include good biaxial impact properties as well as a high energy-absorption capability.

BRIEF DESCRIPTION OF THE INVENTION

This object has been solved with the composition as defined in claim 1. Preferred embodiments are disclosed in subclaims 2 to 8. Further the present invention provides articles produced from the composition as well as the use of the composition for preparing molded articles as defined in claims 9 and 10, respectively.

DETAILED DESCRIPTION OF THE INVENTION

Glass Fiber

The composition in accordance with the present invention comprises glass fibers in an amount of from more than 15 to 50-wt %, preferably from 20 to 40-wt %. The glass fibers may be selected form short cut or long (endless) glass fibers but typically the glass fibers are cut fibers having a length, prior to compounding with the polypropylene, of several millimeters, such as from 3 to 10 mm or longer, preferably 3.5 to 5 mm. Glass fibers of this type are commercially available and examples thereof are the trade designations P968 of Vetrotex or CS147 (R34BX1) of OCF.

Typically the glass fibers have a diameter of about 10 to 15 µm although also other diameters for glass fibers are contemplated in accordance with the present invention.

Heterophasic Polypropylene

Further the present invention comprises a heterophasic polypropylene as defined in claim 1. The heterophasic polypropylene is a reactor made heterophasic propylene polymer, i.e. a reaction product which is obtained from a polymerization reaction by sequentially polymerizing the different components of the heterophasic polypropylene. The heterophasic polypropylene employed in accordance with the present invention is not a compound, prepared by mechanical blending the individual components using conventional compounding processes.

The heterophasic polypropylene as defined herein typically is present in an amount, based on the total weight of the composition of from less than 85 to 50-wt %, preferably 80 to 60-wt %. In embodiments preferred are also amounts of from 50 to 70-wt %, based on the overall weight of the composition.

The term "heterophasic propylene copolymer" as employed in the present application defines a copolymer comprising a matrix phase and a dispersed phase. The matrix phase usually amounts to about 55 to 95-wt % of the heterophasic polypropylene while the dispersed phase amounts to 5 to 45-wt % of the heterophasic polypropylene, more preferably 15 to 40-wt % and in embodiments 20 to 30-wt %.

The modality of the matrix phase with respect to molecular weight distribution and thus with respect to melt flow ratio is not critical. Thus the matrix phase may be unimodal or multimodal including bimodal with respect to molecular weight distribution. The matrix phase may also be multimodal with respect to comonomer distribution.

The heterophasic polypropylene to be employed in accordance with the present invention may thus comprise a matrix phase comprising only one propylene polymer component or the matrix phase may comprise more than one propylene polymer, such as two, three or four different propylene polymers. In preferred embodiments, the matrix phase comprises one or at least two propylene polymer components.

The matrix phase usually comprises at least one propylene homopolymer or a propylene copolymer and/or a further propylene copolymer. Preferably, the matrix phase comprises at least two propylene polymer components, preferably either (i) a propylene homopolymer or a propylene random copolymer in combination with (ii) a propylene random copolymer. The propylene polymer components for the matrix phase are combined by preparing the matrix phase as in-situ reactor blend, i.e. by preparing the different components of the matrix phase during subsequent polymerization steps in suitable reactor arrangements.

By the term "random copolymer" is meant herein that the comonomer in said copolymer is distributed randomly, i.e. by statistical insertion of the comonomer units, within the copolymer chain. Said term "random" copolymer is generally known and used in the art.

The term "comonomer" is defined herein as the types of monomers present in the heterophasic polypropylene composition other than propylene. Preferred comonomers are ethylene and $C_4$-$C_8$ α-olefins.

The dispersed phase, i.e. the elastomeric rubber phase, as defined in claim 1 comprises at least two suitable elastomeric copolymers, or more such as three or four. Such multimodal dispersed phases may in particular be multimodal concerning comonomer content, molecular weight distribution and/or XS content. Such multimodal dispersed phases are prepared by suitably preparing the polymers in a series of reactors. In preferred embodiments, the heterophasic propylene copolymer to be employed in accordance with the present invention comprises a dispersed phase comprising two elastomeric rubbery polymer phases. Suitable and preferred embodiments of the heterophasic polypropylene are discussed in the following.

The matrix phase of the heterophasic polypropylene to be used in accordance with the present invention furthermore is characterized in that it comprises up to 10-wt % of ethylene and/or at least one $C_4$-$C_8$ α-olefin, preferably ethylene, typically 1 to 7-wt %, and in embodiments 2 to 5-wt %. In accordance with the present invention, the matrix phase of the heterophasic polypropylene, however, may also be a homopolymer, wherein the term "homopolymer" also comprises embodiments wherein minor amounts of less than 1-wt % of comonomers are present, wherein the comonomers are selected among those identified above.

The matrix phase of the heterophasic polypropylene may be unimodal or multimodal, i.e. the different components of the matrix phase may either show similar molecular weight distributions or different molecular weight distributions (and accordingly also $MFR_2$ values). Herein the term "multimodal" includes bimodal molecular weight distribution. An embodiment where the matrix phase of the heterophasic polypropylene has at least bimodal molecular weight distribution can be realized by providing a matrix phase having a broad molecular weight distribution and comprising the at least two propylene polymer components (i) and (ii) with different weight average molecular weights (MW) and, thus, with different melt flow ratios ($MFR_2$). Such an embodiment may be exemplified by a mixture of a lower molecular weight component with a higher molecular weight component. The lower molecular weight (LMW) component has a higher $MFR_2$ than the higher molecular weight (HMW) component. In embodiments, the LMW component is the at least one component (i) while the HMW component is the at least one component (ii). In embodiments, this order, however, may also be reversed. As outlined above, it is preferred when the matrix phase of the heterophasic polypropylene is bimodal, comprising a LMW component and a HMW component. The amount of the LMW component is typically between 30 and 70-wt %, preferably 40 to 60-wt % of the total amount of the matrix phase. The amount of the HMW component is typically between 30 and 70-wt %, preferably 40 to 60-wt % of the total amount of the matrix phase.

In embodiments, the ratio ($MFR_2$ of LMW component) to ($MFR_2$ of HMW component) is typically at least 3, preferably at least 4, more preferably at least 10, and in some end applications even at least 15 is desired. The upper limit of said ratio may be up to 200, preferably up to 100.

In embodiments, it is also possible that the matrix phase of the heterophasic polypropylene is multimodal, including bimodal, with respect to the comonomer distribution. In accordance with the present invention this means a different comonomer content (weight percent) between the components of the matrix phase, i.e. components (i) and (ii) of the matrix component. As outlined above, the matrix component may comprise at least two different propylene polymer components, i.e. at least one component in accordance with definition (i) and at least one component in accordance with definition (ii). However, the matrix component may comprise more than one component of each of the components (i) and (ii) as defined above. At least one of components (i) and (ii) is a copolymer. In case of two different comonomer components (i) and (ii), the comonomer content and/or the type of comonomer may differ. Thus also any mixtures of propylene with different comonomer of at least one copolymer component of the matrix are covered herein.

In embodiments it is preferred when the components (i) and (ii) differ with respect to their comonomer content and it is preferred when the comonomer content of (i) is lower than the comonomer content of (ii).

The matrix phase in accordance with the present invention preferably shows an $MFR_2$ (ISO 1133, at 230° C., 2.16 kg load) of from 0.5 to 100 g/10 min, such as from 20 to 80 g/10 min and in embodiments from 30 to 70 g/10 min.

The overall $MFR_2$ (ISO 1133, at 230° C., 2.16 kg load) of the heterophasic composition typically is from of from 5 to 25 g/10 min, such as from 7.5 to 20 g/10 min and in embodiments from 9 to 15 g/10 min.

Further, it is preferred when the $MFR_2$ of matrix phase of the heterophasic propylene copolymer is from 4 to 8 times preferably 4 to 6 times, more preferably 4 to 5 times the overall $MFR_2$ of the heterophasic propylene copolymer.

The heterophasic polypropylene to be employed in accordance with the present invention furthermore comprises a dispersed elastomeric rubber phase. This dispersed phase (rubber phase) makes up to 45-wt % of the total weight of the heterophasic polypropylene. Suitable ranges are 10 to 40-wt % and in embodiments also 20 to 30-wt %.

The dispersed phase comprises elastomeric copolymers of propylene and one or more olefin comonomer, preferably ethylene. The rubber phase comprises from 20 to 80-wt % of olefin comonomer, preferably ethylene. Examples of olefin comonomers, in addition to the preferred ethylene, are $C_4$-$C_8$ alpha-olefins. The rubber phase comprises preferably a high amount of comonomer, preferably 30 to 60-wt %, more preferably 30 to 40-wt %.

According to a preferred embodiment of the present invention, the dispersed phase, i.e. the ethylene rubber copolymer is an ethylene propylene rubber (EPR). EPR materials are more cost-effective than rubbers with higher α-olefins and they can be synthesized in a final step of a multi-step process, where the first steps synthesize the matrix polymer.

As outlined above, the dispersed phase comprises at least two rubber components, differing with respect to at least one property, selected from comonomer content, IV, XS or $MFR_2$.

These at least two rubber compounds are typically present in a weight ratio of about 0.5:2 to 2:0.5, such as 1:2 to 2:1 and also about 1:1.

Preferably, the bimodal rubber phase comprises two different EPR components, i.e. elastomeric ethylene propylene copolymers. These two different rubber components typically differ, at least with respect to one property, such as intrinsic viscosity, comonomer content and/or $MFR_2$ and preferably the two different rubber components differ with respect to two properties, preferably intrinsic viscosity and comonomer content. Preferably, one of the two rubber components has a higher comonomer content, preferably ethylene content, compared with the other rubber component. It is also preferred when the at least two different rubber compounds show differing IV values, more preferably the difference in IV values is at least 1 dl/g. In particular, preferred embodiments the ratio of the two IV values is at least 2 (higher IV value÷lower IV values). In more preferred embodiments the rubber component with the higher comonomer content, preferably ethylene content, shows a smaller intrinsic viscosity, compared with the rubber component showing the lower comonomer content, preferably ethylene content. A particular preferred embodiment in this respect is given when the rubber component with the higher comonomer content has a comonomer content, preferably ethylene content, being 5-mol % or more higher than the comonomer content, preferably ethylene content of the other rubber component With respect to the intrinsic viscosity, it is preferred when the intrinsic viscosity difference between the higher comonomer content rubber component and the lower comonomer content rubber component is at least 1.0 dl/g, more preferably at least 1.5 dl/g, and in embodiments accordingly from 1.0 dl/g to 6.0 dl/g. Suitable examples of bimodal rubber components in combination with a matrix phase are disclosed in WO 2005/118712, incorporated herein by reference.

Accordingly, a particularly preferred heterophasic propylene copolymer to be employed in accordance with the present invention is a heterophasic propylene copolymer as defined in WO 2005/118712 in claim 1, components A) to C). Accordingly, a preferred heterophasic propylene copolymer to be employed in accordance with the present invention comprises the following:

A) 45 to 79 parts by weight of a propylene polymer comprising a propylene homopolymer and/or a propylene copolymer with up to 10-mol % of ethylene and/or one or more $C_4$-$C_8$ α-olefins, the propylene polymer having an $MFR_2$ of $\geq$40 g/10 min, B) 10 to 27 parts by weight of an elastomeric ethylene-propylene copolymer having an intrinsic viscosity (IV) of $\leq$2.4 dl/g and an ethylene content of at least 75-mol %, and C) 5 to 22 parts by weight of an elastomeric ethylene-propylene copolymer having an intrinsic viscosity (IV) of 4.0 to 6.5 dl/g and an ethylene content of up to 70-mol %.

The preferred embodiments for components A) to C) as defined in WO 2005/118712 are incorporated herein by reference.

In embodiments of the present invention the intrinsic viscosity of the dispersed phase is preferably equal to or greater than the intrinsic viscosity of the matrix phase. Such an embodiment may lead to an improvement of the dispersion of the dispersed phase in the matrix phase.

The heterophasic propylene copolymer as disclosed above suitably displays an intrinsic viscosity (IV) of the xylene soluble fraction (XS) of 3.5 dl/g or less, with a preferred lower limit of 1 dl/g. A suitable range, for example, is 1.8 to 3.1 dl/g, preferably 2.5 to 3.1 dl/g. The total xylene soluble fraction of the heterophasic propylene copolymer suitably amounts up to 60-wt % of the heterophasic propylene copolymer, for example, 5 to 60-wt %, in embodiments 7 to 60-wt % and in other embodiments 7 to 40-wt %, 7 to 30-wt % or 12 to 40-wt %. The xylene soluble fraction of the matrix phase amounts up to 35-wt %, and in embodiments 2 to 5-wt % or 2 to 15-wt %. This value can be appropriately adjusted by measures known to the skilled person in the art depending on the desired end application.

The heterophasic polypropylene to be employed in accordance with the present invention furthermore shows an overall comonomer content, preferably ethylene content of at least 12-wt %, preferably 15-wt % or more, and in embodiments up to 17-wt %.

As outlined above, the heterophasic polypropylene to be employed in accordance with the present invention is prepared in a manner known to the skilled person in the art, namely sequential polymerization processes.

According to the invention the heterophasic polypropylene is a reactor made heterophasic polypropylene. Reactor made heterophasic polypropylene means herein a reaction product which is obtained from a polymerization reaction sequentially polymerizing the different components of the heterophasic polypropylene. In this respect, any polymerization method, including solution, slurry and bulk polymerization or gas phase polymerization can be used, in any desired order. Bulk polymerization defines in the present application a polymerization in a reaction medium comprising at least 60-wt % monomer.

In the following, a preferred process for preparing first the matrix phase of the heterophasic polypropylene is described, followed by a description of a further preferred embodiment also including the preparation of the dispersed phase.

When the matrix is unimodal with respect to the molecular weight distribution and comonomer distribution, it may be prepared in a single stage process e.g. as slurry or gas phase process in a slurry or gas phase reactor. Preferably, the unimodal matrix is polymerized as a slurry polymerisation. Alternatively, the unimodal matrix may be produced in a multistage process using at each stage process conditions which result in similar polymer properties.

The matrix phase of the heterophasic polypropylene to be used in accordance with the present invention, which may comprise components (i) and (ii) as defined above, may be prepared by polymerizing, in a slurry reactor, for example a loop reactor, propylene monomers optionally together with one or more comonomers, in the presence of a polymerization catalyst to produce component (i) of the matrix phase of the heterophasic polypropylene. This component (i) is then transferred to a subsequent gas phase reactor, wherein in the gas phase reactor propylene monomers are reacted in the presence of suitably selected comonomers in order to produce component (ii) in the presence of the reaction product of the first step. This reaction sequence provides a reactor blend of components (i) and (ii) constituting the matrix phase of the heterophasic polypropylene. It is of course possible by the present invention that the first reaction is carried out in a gas phase reactor while the second polymerization reaction is carried out in a slurry reactor, for example a loop reactor. It is furthermore also possible to reverse the order of producing components (i) and (ii), which has been described above in the order of first producing component (i) and then producing component (ii). The above-discussed process, comprising at least two polymerization steps, is advantageous in view of the fact that it provides easily controllable reaction steps enabling the preparation of a desired reactor blend of the matrix phase of the heterophasic polypropylene. The polymerization steps may be adjusted, for example by appropriately selecting monomer feed, comonomer feed, hydrogen feed, temperature and pressure in order to suitably adjust the properties of the polymerization products obtained. It is in particular possible to obtain the possible multimodality, preferably the bimodality, of the matrix phase of the heterophasic polypropylene, with respect to the ethylene distribution as well as with respect to the molecular weights and $MFR_2$ values of the matrix phase components during said multistage polymerization procedures.

Such a process can be carried out using any suitable catalyst for the preparation of propylene polymers, including. Preferably, the process as discussed above is carried out using a Ziegler-Natta catalyst, in particular a high yield Ziegler-Natta catalyst (so called fourth and fifth generation type to differentiate from low yield, so called second generation Ziegler-Natta catalysts). A suitable Ziegler-Natta catalyst to be employed in accordance with the present invention comprises a catalyst component, a co-catalyst component and at least one electron donor (internal and/or external electron donor, preferably at least one external donor). Preferably, the catalyst component is a Ti—Mg-based catalyst component and typically the co-catalyst is an Al-alkyl based compound. Suitable catalysts are in particular disclosed in U.S. Pat. No. 5,234,879, WO 92/19653, WO 92/19658 and WO 99/33843, incorporated herein by reference.

A suitable Ziegler-Natta catalyst to be employed in accordance with the present invention comprises a catalyst component, a co-catalyst component and at least one electron donor (internal and/or external electron donor, preferably at least one external donor). Preferably, the catalyst component is a Ti-Mg based catalyst component and typically the co-catalyst is an Al-alkyl based compound. Suitable catalysts are in particular disclosed in U.S. Pat. No.5,234,879, WO 92/19653, WO 92/19658 and WO 99/33843, incorporated herein by reference.

Preferred external donors are the known silane-based donors, such as dicyclopentyl dimethoxy silane or cyclohexyl methyldimethoxy silane.

One embodiment of a process as discussed above is a loop-gas phase process, such as developed by Borealis, known as Borstar® technology, described for example in EP 0887379 A1 and WO 92/12182, incorporated herein by reference.

With respect to the above-mentioned preferred slurry-gas phase process, the following general information can be provided with respect to the process conditions.

Temperature of from 40° C. to 110° C., preferably between 60° C. and 100° C., in particular between 70° C. and 90° C., with a pressure in the range of from 20 to 80 bar, preferably 30 to 60 bar, with the option of adding hydrogen in order to control the molecular weight. The reaction product of the slurry polymerization, which preferably is carried out in a loop reactor, is then transferred to the subsequent gas phase reactor, wherein the temperature preferably is within the range of from 50° C. to 130° C., more preferably 60° C. to 100° C., at a pressure in the range of from 5 to 50 bar, preferably 15 to 35 bar, again with the option of adding hydrogen in order to control the molecular weight.

The residence time can vary in the reactor zones identified above. In embodiments, the residence time in the slurry reaction, for example the loop reactor, is in the range of from 0.5 to 5 hours, for example 0.5 to 2 hours, while the residence time in the gas phase reactor generally will be from 1 to 8 hours.

The properties of the matrix phase produced with the above-outlined process may be adjusted and controlled with the process conditions as known to the skilled person, for example by one or more of the following process parameters: temperature, hydrogen feed, comonomer feed, propylene feed, catalyst, type and amount of external donor, split between two or more components of a multimodal polymer.

In accordance with the present invention, the matrix phase produced in accordance with the preferred process discussed above is then transferred into a further reactor, preferably a gas phase reactor in order to polymerize an elastomeric propylene copolymer component, i.e. the dispersed phase, in the presence of the matrix phase.

In case of the preferred dispersed phased comprising at least two rubber phases, a sequence of two or more reactors, suitably gas phase reactors, may be employed for polymerizing the rubber phases.

The composition in accordance with the present invention, due to the unique combination of glass fibers with a heterophasic polypropylene typically having a high comonomer, preferably ethylene content, enables the provision of a far improved balance of properties, such as tensile modulus of above 4300 MPa, with impact properties according to ISO 179 of 65 $kJ/m^2$ or more at 23° C. and 70 $kJ/m^2$ or more at −20° C. Such a combination of mechanical properties, at glass fiber contents of about 30-wt %, are not available using the approaches as developed in the art so far, such as compounding of polypropylene with a rubber component or crosslinking techniques.

In particular, the compositions in accordance with the present invention are characterized by the above-outlined improved balance of tensile properties and impact properties, in combination with highly satisfactory values for biaxial impact behavior and energy absorption, properties that can be quantified by hydropulse measurements and the corresponding values, such as force at maximum (at 23° C. as well as −20° C.) and puncture energy (at 23° C.). In this respect, the examples and comparative examples as contained herein dearly demonstrate that in accordance with the present invention, when compared with non-inventive compositions showing an overall composition only differing with respect to the dispersed phase of the heterophasic polypropylene composition, compositions in accordance with the present invention show higher values for force at maximum and puncture energy, demonstrating higher energy adsorption properties.

In accordance with a particularly preferred embodiment of the present invention, the value for force at maximum at 23° C., an important measure in particular for automotive applications, is at least 5% preferably at least 10% higher, compared with the respective value determined for a comparative example with the same composition except for the composition of the dispersed phase of the heterophasic polypropylene composition. More preferably, this increase is at least 12%, and in embodiments even at least 15%.

Accordingly the present invention provides an improvement over the prior art. Illustrative examples are given in the following Examples and Comparative Examples.

The composition in accordance with the present invention, due to the improved balance of properties, is in particular suitable to produce molded articles, such as automotive parts or other articles typically prepared by injection molding techniques.

Additional Components

The composition in accordance with the present invention may also include a compatibilizer or coupling agent for improving the miscibility and dispersibility of the glass fibers in the polymer matrix. Any type of compatibilizer and/or coupling agent may be used and illustrative examples thereof are maleic anhydride grafted propylene homopolymers or propylene-ethylene block-copolymers as well as Polybond 3150/3200 of Chemtura, Epolene G3003 of Eastman and Exxelor PO1015 or PO1020 of Exxon. Amounts of compatibilizer and/or coupling agents depend from the type and amount of glass fibers but typically a compatibilizer is added in an amount of from 0.5 to 5-wt % based on the weight of the composition.

It is also possible to add further polymeric components, such as further elastomeric ethylene copolymers, including ethylene-propylene copolymer and also preferably ethylene copolymers with higher alpha-olefins having from 6 to 12 carbon atoms. A particular preferred embodiment is an ethylene-1-octene copolymer with a high ethylene content of preferably above 80-mol %. Such copolymers may be added in amounts of from 2 to 20-wt %, based on the overall weight of the composition, preferably 5 to 15-wt %. Commercially available examples of preferred ethylene copolymers are the polymers sold under the tradename ENGAGE by DuPont Dow, for example ENGAGE 8100, ENGAGE 8180, ENGAGE 8200, and ENGAGE 8400.

Examples of ethylene-propylene elastomers which can be employed are elastomers used as polyolefin modifiers, such as those sold under the DUTRAL™ by Polimeri, i.e. ethylene-propylene elastomers with an MFR (230° C. 5 kg) of from 1 to 5 g/10 min.

These additional components may further increase the energy absorption properties of the compositions in accordance with the present invention without effecting, however, mechanical properties detrimentally. Preferred embodiments of the additional polymeric components demonstrate the above-outlined improvement and, in this respect, the examples and comparative examples as contained herein further prove that these additional polymeric components, when used within a composition in accordance with the present invention, do not hinder the beneficial effects of the present invention as outlined above.

The composition in accordance with the present invention furthermore may comprise conventional additives, such as antioxidants, stabilizers, coloring agents, UV stabilizers, nucleating agents, antistatic agents, slip/mold release agents etc. Typically these additives are present in amounts of 2-wt % each or less, preferably 0.5-wt % each or less, and prefer-ably the total amount of additives does not exceed 8-wt %, preferably 5-wt %. Other filler may also be used in usual amounts.

The overall $MFR_2$ value of the composition in accordance with the present invention is typically in the range of from 0.5 to 10.0 g/10 min, such as from 1.0 to 7.5 g/10 min, and in embodiments 2.0 to 5.0 g/10 min.

Measurement Methods

MFR: The meltflow rates (MFR) were measured under a load of 2.16 kg and at a temperature of 230° C. The meltflow rate is the quantity of polymer in grams which the test apparatus standardized to ISO 1133 extrudes within 10 minutes at the load and the temperature as indicated above.

Impact strength: The notched impact strength (NIS) was determined according to ISO 179/1eA at 23° C. or −20° C. by using injection molded test specimens as described in EN ISO 1873-2(80×10×4 mm). The unnotched impact strength (IS) was determined according to ISO 179/1eU at 23° C. or −23° C. by using injection molded test specimens as described in EN ISO 1873-2 (80×10×4 mm)

Flexural modulus: Flexural modulus was determined according to ISO 178 using injection molded test specimens as described in EN ISO 1873-2 (80×10×4 mm).

Tensile modulus: Tensile was determined according to ISO 527 using injection molded test specimens as described in EN ISO 1873-2 (170×10×4 mm).

Tensile strength: Tensile strength was determined according to ISO 572 using injection molding test specimens as described in EN ISO 1873-2 (170×10×4 mm).

The xylene soluble fraction (XS) as defined and described in the present invention is determined as follows: 2.0 g of polymer are dissolved in 250 ml p-xylene at 135° C. under agitation. After 30 minutes, the solution was allowed to cool for 15 minutes at ambient temperature and then allowed to settle for 30 minutes at 25±0.5° C. The solution was filtered with filter paper into two 100 ml flask. The solution from the first 100 ml vessel was evaporated in nitrogen flow and the residue dried under vacuum at 90° C. until constant weight is reached. Xylene soluble fraction (percent) can then be determined as follows:

$$XS\% = (100 \times m_1 \times v_0)/(m_0 \times v_1).$$

wherein $m_0$ designates the initial polymer amount (grams), $m_1$ defines the weight of residue (grams), $v_0$ defines the initial volume (milliliter) and $v_1$ defines the volume of analyzed sample (milliliter).

The intrinsic viscosity (IV) value is increasing with the molecular weight of a polymer. IV of XS is measured according to ISO 1628 in tetrahydronaphthalin at 135° C.

Comonomer content (weight percent) is determined in a known manner based on FTIR, calibrated with C13NMR.

The ethylene content is determined using fourier transformed infrared spectroscopy (FTIR) using the peak height at 733 $cm^{-1}$ or the ethylene peak area (760 to 700 $cm^{-1}$) as a measure of ethylene content. The measurement is carried out on compressed molded films having a thickness of 50 μm, using a calibration curve established based on 13C-NMR measurements in line with EN17025.

Multimodality including bimodality with respect to the comonomer distribution can be demonstrated using the results of the analysis with respect to the comonomer content. The multimodality, in particular is evaluated by temperature rising elution fractionation (TREF) as explained in Aust et al., Polymer Testing, 25, 2006, 896-903. Modality with respect to the molecular weight distribution can be determined in a usual manner employing size exclusion chromatography (SEC).

HDT: measured according to ISO 75 A with injection-molded samples as described in EN ISO 1873-2 (80×10×4 mm).

Hydropuls (Instrumented Puncture Test): determined according to EN ISO 6603-2:2000, test speed 4.4 m/s, lubricated striker, clamped specimen. The specimen used was an injection-molded sample as described in EN ISO 1873-2 with dimensions of 60 mm×60 mm and, differing from from the description in the test standards mentioned above, a thickness of 3 mm.

In the following examples, compositions were prepared using the components as indicated in the tables and as explained further below in the amounts indicated, using a twin-screw extruder with a temperature profile starting with 180° C. and using an extrusion temperature of 220° C. The heterophasic compositions employed in the Examples and Comparative Examples contained identical usual processing additives in identical amounts.

EXAMPLES

|  |  | CE1 | E1 | CE2 | E2 | CE3 | E3 |
|---|---|---|---|---|---|---|---|
| MFR | g/10 min | 2.7 | 3 | 2.5 | 2.9 | 2.1 | 2.4 |
| Tensile modulus | MPa | 6070 | 5940 | 5100 | 4320 | 5400 | 4760 |
| Tensile strength | MPa | 72 | 72 | 60 | 49 | 58 | 51 |
| Tensile strain at tensile strength | % | 4.2 | 5.7 | 6.3 | 6.7 | 5.0 | 5.7 |
| Tensile stress at break | MPa | 71 | 64 | 57 | 45 | 56 | 48 |
| Tensile strain at break | % | 4.9 | 6.6 | 7.6 | 8.2 | 6.3 | 7.1 |
| Flexural modulus | MPa | 5570 | 5030 | 4620 | 3920 | 5000 | 4400 |
| Flexural strength | MPa | 94 | 82 | 69 | 55 | 72 | 60 |
| Flexural strain at flexural strength | % | 4.4 | 4.6 | 4.7 | 4.8 | 4.5 | 4.7 |
| Flexural stress at 3.5% strength | MPA | 93 | 79 | 67 | 53 | 70 | 58 |
| IS 23° C. | $kJ/m^2$ | 60 | 81 | 89 | 99 | 79 | 84 |
| IS −20° C. | $kJ/m^2$ | 61 | 75 | 76 | 84 | 70 | 78 |
| NIS 23° C. | $kJ/m^2$ | 22 | 31 | 39 | 47 | 32 | 39 |
| NIS −20° C. | $kJ/m^2$ | 14 | 17 | 20 | 25 | 18 | 22 |
| HDT | ° C. | 139 | 136 | 124 | 117 | 130 | 124 |
| HYDROPULS |  |  |  |  |  |  |  |
| Force at Max. 23° C. | N | 1780 | 2150 | 2240 | 2530 | 2040 | 2450 |
| Puncture Energy 23° C. | J | 12.7 | 15.8 | 15.9 | 16.2 | 16.1 | 16.6 |
| Force at Max. −20° C. | N | 2010 | 2150 | 2130 | 2200 | 2060 | 2100 |
| Puncture Energy −20° C. | J | 8.7 | 11.4 | 11.9 | 13.9 | 12.8 | 13.2 |
| KSR 4525 | Wt % | 67 |  | 57 |  | 57 |  |
| Vetrotex P968 | Wt % | 32 | 32 | 32 | 32 | 32 | 32 |
| EXXELOR PO1020 | Wt % | 1 | 1 | 1 | 1 | 1 | 1 |
| EE013AE | Wt % |  | 67 |  | 57 |  | 57 |
| ENGAGE 8200 | Wt % |  |  | 10 | 10 |  |  |
| DUTRAL PM06PLE | Wt % |  |  |  |  | 10 | 10 |

EE013AE and KSR4525 are heterophasic polypropylene compositions comprising ethylene as comonomer, available from Borealis, with overall $C_2$ contents of about 16.5-wt %, a rubber amount (XS) of about 27-wt % and an IV of the XS of about 3 dl/g and a $C_2$ content of the XS of about 50 mol %. EE013EA however comprises a bimodal rubber while KSR4525 comprises a monomodal rubber phase. WW013AE shows an $MFR_2$ of about 12 g/10 min while KSR4525 displays an $MFR_2$ of about 8 g/10 min. The matrix phase of EE012AE shows an $MFR_2$ of about 50 g/10 min while KSR4525 shows an $MFR_2$ of the matrix phase of about 25 g/10 min.

Dutral PM 06PLE is an ethylene-propylene elastomer commercially available from Polimeri with an MFR value of (230° C./5 kg load) of about 1.8 g/10 min.

The examples and comparative examples as illustrated herein clearly prove that the present invention surprisingly enables an improvement regarding a balance of impact and tensile properties of glass fiber containing polypropylenes and in particular a clear improvement regarding energy absorption (HYDROPULS).

The invention claimed is:

1. A composition comprising:
   a) more than 15-wt % glass fibers, and
   b) a heterophasic polypropylene composition comprising a matrix phase and a dispersed phase, the dispersed phase comprising at least two dispersed elastomeric components, wherein the heterophasic polypropylene composition has an overall comonomer content of 12-wt % or more, and wherein the at least two dispersed elastomeric components have a comonomer content of 20-wt % or more.

2. The composition of claim 1, wherein the comonomer is ethylene.

3. The composition of claim 1 or 2, wherein the dispersed phase of the heterophasic polypropylene consists of two phases.

4. The composition of claim 1 or 2, wherein the composition comprises from 20 to 40-wt % of the glass fibers.

5. The composition of claim 1 or 2, wherein the heterophasic polypropylene composition comprises an overall $MFR_2$ of from 9 to 15 g/10 min, and the matrix phase of the heterophasic polypropylene composition comprises an $MFR_2$ of from 30 to 70 g/10 min.

6. The composition of claim 1 or 2, wherein the composition further comprises up to 20-wt % of an elastomeric ethylene copolymer with an alpha-olefin having from 6 to 12 carbon atoms.

7. The composition of claim 1 or 2, wherein the composition comprises from 50 to 70-wt % of the heterophasic polypropylene composition.

8. The composition of claim 1 or 2, wherein the composition further comprises an additive selected from antioxidants, stabilizers, coloring agents, UV stabilizers, nucleating agents, antistatic agents, slip/mold release agents, and coupling agents, wherein the additive is present in amounts of 2-wt % each or less.

9. A molded article comprising the composition of claim 1 or 2.

10. A method for preparation of a molded article, the method comprising providing the composition of claim 1 or 2 and molding the composition to obtain the molded article.

* * * * *

UNITED STATES PATENT AND TRADEMARK OFFICE
CERTIFICATE OF CORRECTION

PATENT NO. : 8,519,044 B2  
APPLICATION NO. : 13/488980  
DATED : August 27, 2013  
INVENTOR(S) : Wolfgang Stockreiter et al.

Page 1 of 1

It is certified that error appears in the above-identified patent and that said Letters Patent is hereby corrected as shown below:

On the Title Page, Item (73) Assignee "Borealis Technology Oy, Porvoo (FI)" should read, --Borealis Technology OY, Porvoo (FI)--.

Signed and Sealed this  
Thirteenth Day of May, 2014

Michelle K. Lee  
*Deputy Director of the United States Patent and Trademark Office*